US012657201B2

(12) United States Patent
Chaudhry et al.

(10) Patent No.: US 12,657,201 B2
(45) Date of Patent: Jun. 16, 2026

(54) FLEXIBLE SCHEMA TABLES

(71) Applicant: Oracle International Corporation,
Redwood Shores, CA (US)

(72) Inventors: Atif Chaudhry, Newark, CA (US);
Chandrasekharan Iyer, Foster City,
CA (US); Beda Christoph
Hammerschmidt, Los Gatos, CA (US)

(73) Assignee: Oracle International Corporation,
Redwood Shores, CA (US)

( * ) Notice: Subject to any disclaimer, the term of this
patent is extended or adjusted under 35
U.S.C. 154(b) by 274 days.

(21) Appl. No.: 16/744,834

(22) Filed: Jan. 16, 2020

(65) Prior Publication Data

US 2021/0224287 A1      Jul. 22, 2021

(51) Int. Cl.
| | |
|---|---|
| *G06F 16/25* | (2019.01) |
| *G06F 16/21* | (2019.01) |
| *G06F 16/22* | (2019.01) |
| *G06F 16/23* | (2019.01) |
| *G06F 16/2457* | (2019.01) |
| *G06N 3/082* | (2023.01) |

(52) U.S. Cl.
CPC .......... *G06F 16/252* (2019.01); *G06F 16/211*
(2019.01); *G06F 16/221* (2019.01); *G06F*
*16/2282* (2019.01); *G06F 16/2358* (2019.01);
*G06F 16/24573* (2019.01); *G06N 3/082*
(2013.01)

(58) Field of Classification Search
CPC ............. G06F 16/211; G06F 16/24573; G06F
16/252; G06F 16/2282; G06F 16/2358;
G06F 16/221; G06N 3/082
See application file for complete search history.

(56) References Cited

U.S. PATENT DOCUMENTS

| | | | |
|---|---|---|---|
| 5,963,642 A | 10/1999 | Goldstein | |
| 9,390,115 B2 | 7/2016 | Liu et al. | |
| 9,864,816 B2 | 1/2018 | Liu et al. | |
| 2003/0212694 A1* | 11/2003 | Potapov ........... | G06F 16/24557 |
| 2004/0148308 A1 | 7/2004 | Rajan | |
| 2004/0220912 A1* | 11/2004 | Manikutty ............. | G06F 16/30 |
| | | | 707/E17.127 |
| 2007/0203941 A1* | 8/2007 | Hongell ................ | G06F 16/289 |
| 2008/0040365 A1 | 2/2008 | Harvey | |
| 2008/0114733 A1 | 5/2008 | Friesenhahn | |
| 2009/0254516 A1 | 10/2009 | Meiyyappan | |
| 2009/0254532 A1 | 10/2009 | Yang | |
| 2010/0036864 A1 | 2/2010 | Augenstein | |
| 2011/0238709 A1* | 9/2011 | Liu ......................... | G06F 16/27 |
| | | | 707/803 |

(Continued)

OTHER PUBLICATIONS

Various, "MySQL 8.0 Reference Manual.", Oracle, 2017, Revision
54049 (Year: 2017).*

(Continued)

*Primary Examiner* — William P Bartlett
(74) *Attorney, Agent, or Firm* — Hickman Becker
Bingham Ledesma LLP; Marcel K. Bingham

(57)      ABSTRACT

New columns to be dynamically created and stored in a
database merely in response to receipt of DML ("Data
Manipulation Language") SQL statements that reference the
columns. The columns, when referenced by the received
DML statements, are not defined as a column or attribute of
a table by an explicit schema of the database.

18 Claims, 11 Drawing Sheets

(56)            References Cited

U.S. PATENT DOCUMENTS

| | | | |
|---|---|---|---|
| 2012/0179698 A1 | 7/2012 | Muras | |
| 2015/0088924 A1 | 3/2015 | Abadi | |
| 2015/0106382 A1 | 4/2015 | Liu et al. | |
| 2016/0321375 A1* | 11/2016 | Liu | G06F 16/81 |
| 2018/0150510 A1* | 5/2018 | Tanaka | G06F 16/24534 |
| 2019/0370373 A1* | 12/2019 | Hammerschmidt | G06F 16/25 |
| 2020/0218702 A1* | 7/2020 | Fernando | G06F 16/28 |
| 2020/0301917 A1* | 9/2020 | Niu | G06F 16/2282 |

OTHER PUBLICATIONS

U.S. Appl. No. 14/052,622, filed Oct. 11, 2013, Office Action, Aug. 25, 2015.

U.S. Appl. No. 14/052,622, filed Oct. 11, 2013, Notice of Allowance, Mar. 14, 2016.

McHugh et al., "Lore: A Database Management System for Semistructured Data", SIGMOD, vol. 26 No. 3, dated Sep. 3, 1997, 14 pages.

Delconte, Seth, NULL-Friendly: Using Sparse Columns and Column Sets in SQL Server, dated Jul. 10, 2012, pp. 1-10.

* cited by examiner

QM = CREATE TABLE T ( c1 NUMBER,
    c2 VARCHAR2(200)
) ENABLE DYNAMIC_SCHEMA;

QA1 = ALTER TABLE T ENABLE DYNAMIC_SCHEMA;

QA2 = DROP TABLE T DISABLE DYNAMIC_SCHEMA;

"create invisible-container column"

"drop invisible-container column"

Table T

| c1 | c2 | icc1 |
|----|-----|------|
| 1 | abc | {"SHOE_SIZE":"8.5", "HAT_SIZE":"XL"} |
| | | |
| | | |
| | | |

Row 102

FIG. 1

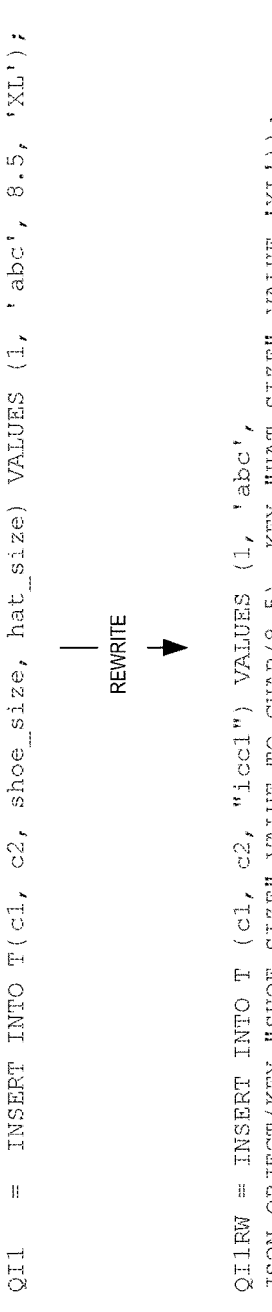

```
QI1   =  INSERT INTO T(c1, c2, shoe_size, hat_size) VALUES (1, 'abc', 8.5, 'XL');

REWRITE →

QI1RW = INSERT INTO T (c1, c2, "iccl") VALUES (1, 'abc',
JSON_OBJECT(KEY "SHOE_SIZE" VALUE TO_CHAR(8.5), KEY "HAT_SIZE" VALUE 'XL'));

QI2   = INSERT INTO T(c1, c2, shoe_size, hat_size) SELECT 1, 'abc', 8.5, 'XL'
FROM dual;

REWRITE →

QI2RW = INSERT INTO t(c1, c2, "iccl") SELECT 1, 'abc',
JSON_OBJECT(KEY "SHOE_SIZE" VALUE TO_CHAR(8.5), KEY "HAT_SIZE" VALUE 'XL')
FROM dual;

QUIR1 = INSERT INTO T VALUES(1, 'abc');

QUIR2 = INSERT INTO T VALUES(1, 'abc', 8.5, 'XL');
```

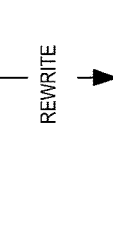

"causes compile error"

FIG. 2B

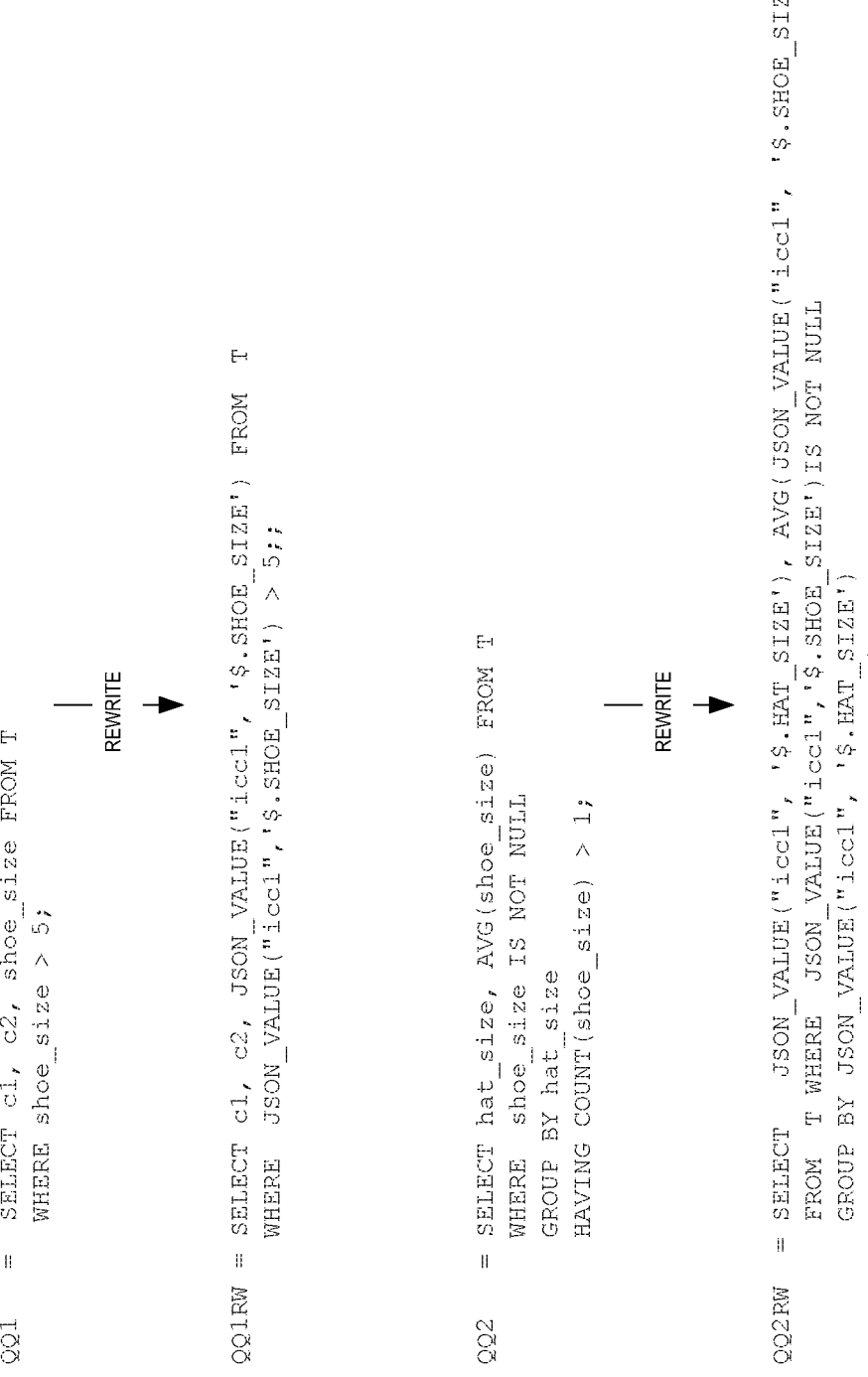

```
QQ1   =  SELECT c1, c2, shoe_size FROM T
         WHERE shoe_size > 5;

REWRITE →

QQ1RW =  SELECT c1, c2, JSON_VALUE("iccl", '$.SHOE_SIZE') FROM T
         WHERE JSON_VALUE("iccl", '$.SHOE_SIZE') > 5;;

QQ2   =  SELECT hat_size, AVG(shoe_size) FROM T
         WHERE shoe_size IS NOT NULL
         GROUP BY hat_size
         HAVING COUNT(shoe_size) > 1;

REWRITE →

QQ2RW =  SELECT  JSON_VALUE("iccl", '$.HAT_SIZE'), AVG(JSON_VALUE("iccl", '$.SHOE_SIZE'))
         FROM T WHERE  JSON_VALUE("iccl", '$.SHOE_SIZE') IS NOT NULL
         GROUP BY JSON_VALUE("iccl", '$.HAT_SIZE')
         HAVING  COUNT(JSON_VALUE("iccl", '$.SHOE_SIZE'))>1;
```

FIG. 3B

```
QU    =  UPDATE T
         SET c1 = 5, hat_size = 'XL' WHERE   shoe_size > 12;

REWRITE

QURW  =  UPDATE T
         SET c1 = 5, icc1 =
         JSON_TRANSFORM("icc1",SET '$.HAT_SIZE'= "XL")
         WHERE JSON_VALUE("icc1",'$.SHOE_SIZE') > 12;

QD    =  DELETE FROM T
         WHERE  shoe_size > 5;

REWRITE

QDWR  =  DELETE FROM t
         WHERE JSON_VALUE("icc1",'$.SHOE_SIZE') > 5;
```

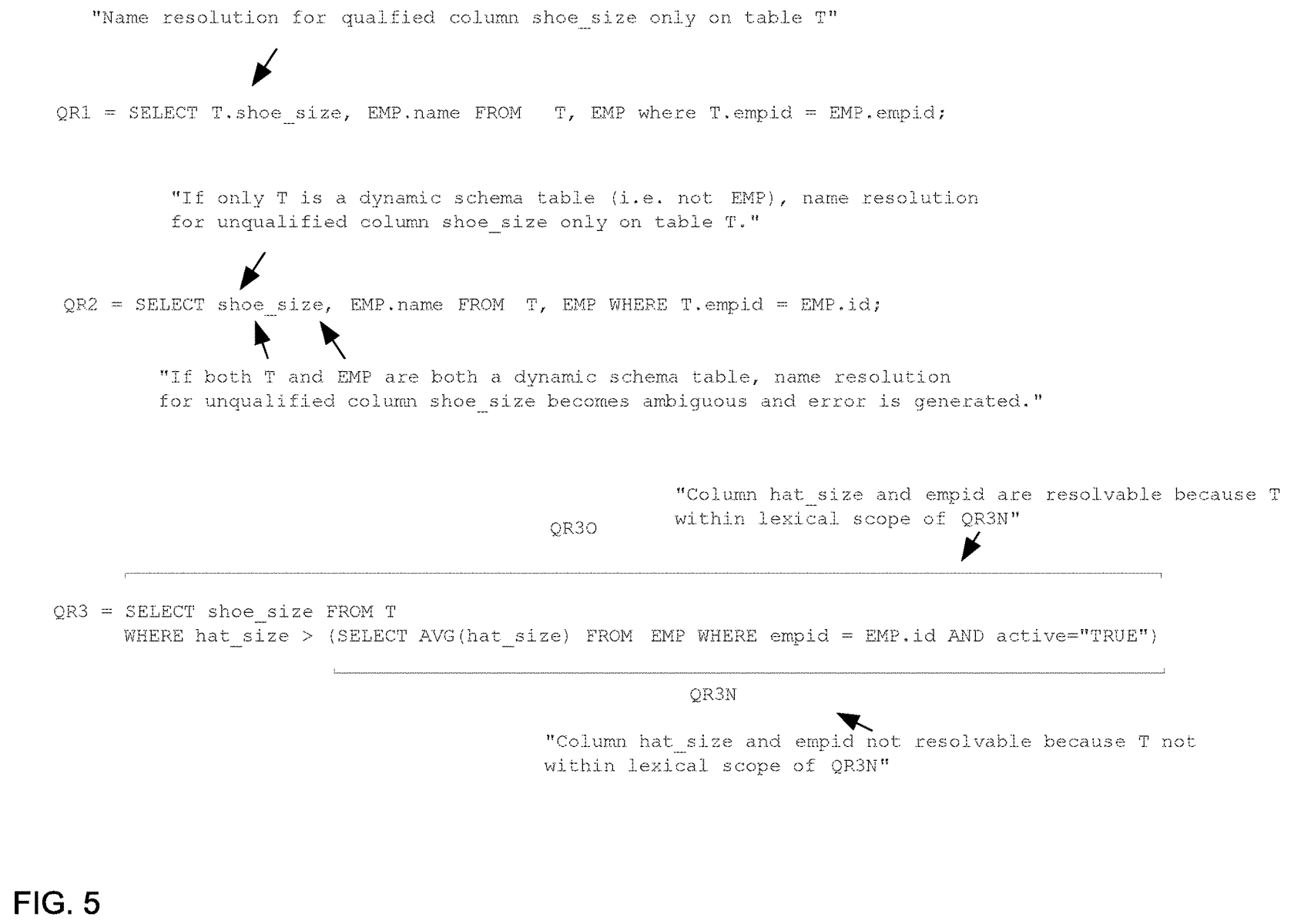

"Name resolution for qualified column shoe_size only on table T"

QR1 = SELECT T.shoe_size, EMP.name FROM  T, EMP where T.empid = EMP.empid;

"If only T is a dynamic schema table (i.e. not EMP), name resolution for unqualified column shoe_size only on table T."

QR2 = SELECT shoe_size, EMP.name FROM  T, EMP WHERE T.empid = EMP.id;

"If both T and EMP are both a dynamic schema table, name resolution for unqualified column shoe_size becomes ambiguous and error is generated."

"Column hat_size and empid are resolvable because T within lexical scope of QR3N"

QR3O

QR3 = SELECT shoe_size FROM T
WHERE hat_size > (SELECT AVG(hat_size) FROM EMP WHERE empid = EMP.id AND active="TRUE");

QR3N

"Column hat_size and empid not resolvable because T not within lexical scope of QR3N"

FIG. 5

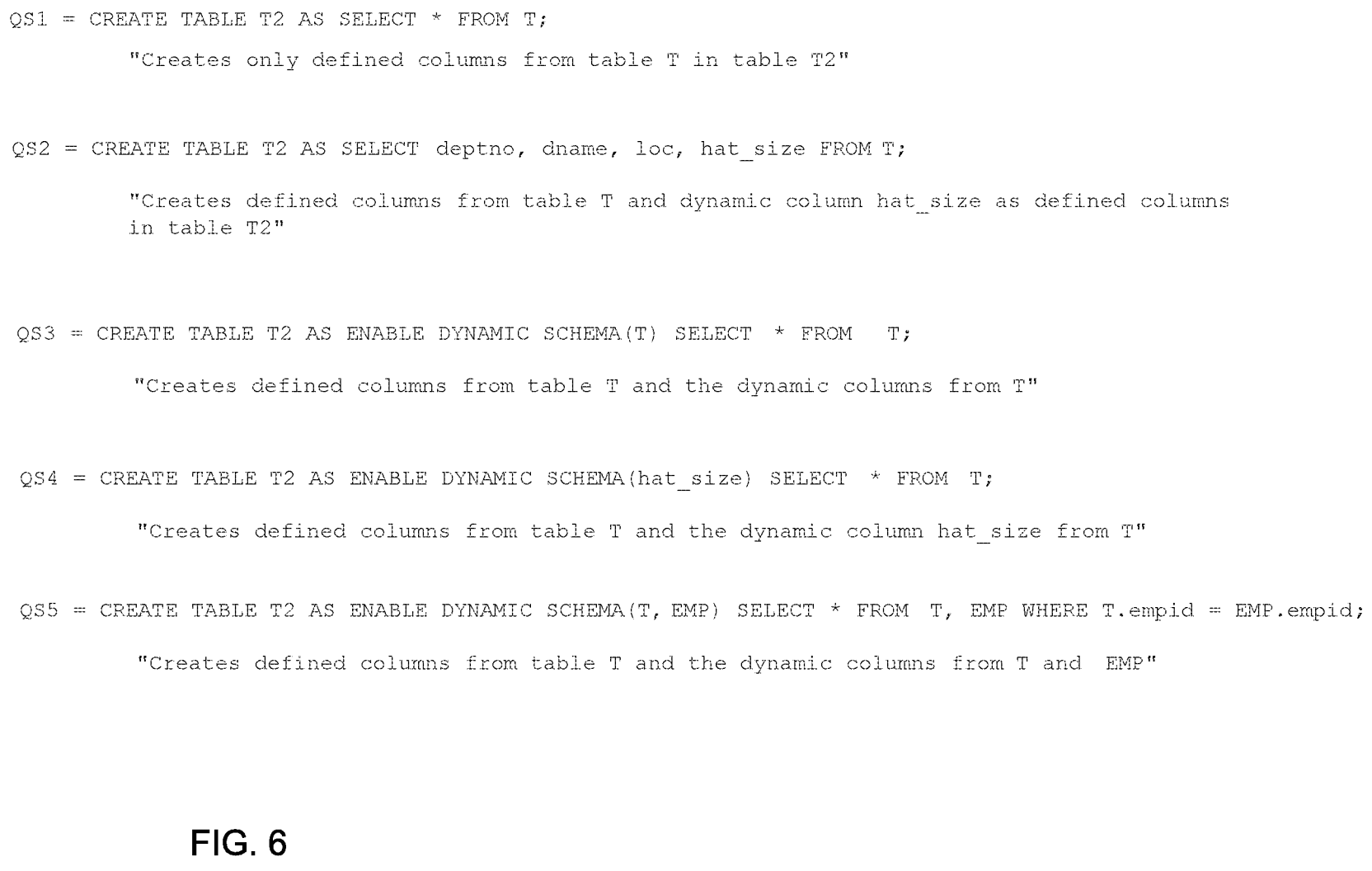

QS1 = CREATE TABLE T2 AS SELECT * FROM T;

"Creates only defined columns from table T in table T2"

QS2 = CREATE TABLE T2 AS SELECT deptno, dname, loc, hat_size FROM T;

"Creates defined columns from table T and dynamic column hat_size as defined columns in table T2"

QS3 = CREATE TABLE T2 AS ENABLE DYNAMIC SCHEMA(T) SELECT * FROM T;

"Creates defined columns from table T and the dynamic columns from T"

QS4 = CREATE TABLE T2 AS ENABLE DYNAMIC SCHEMA(hat_size) SELECT * FROM T;

"Creates defined columns from table T and the dynamic column hat_size from T"

QS5 = CREATE TABLE T2 AS ENABLE DYNAMIC SCHEMA(T, EMP) SELECT * FROM T, EMP WHERE T.empid = EMP.empid;

"Creates defined columns from table T and the dynamic columns from T and EMP"

FIG. 6

Data Guide 701

| PID | PATH | DATATYPE | MIN | MAX |
|-----|------|----------|-----|-----|
| 1 | hat_size | STRING | 4 | 7 |
| 2 | shoe_size | STRING | 4 | 5 |
| 3 | nick_name | STRING | 3 | 13 |
| 4 | fav_color | STRING | 3 | 9 |
| ... | ... | ... | ... | ... |

"Data guide may be accessed by issuing a database statement referencing a view of the data guide."

FIG. 7

FLEXIBLE SCHEMA TABLES

FIELD OF THE INVENTION

The present invention relates to database systems.

BACKGROUND

In application development, assumptions about the structure of data that applications use must be made. Once the structure of the data is known, a structure may be assumed and applications developed accordingly. Applications can only run correctly using data that conforms to the structure assumed. Hence, conformance of data used by an application to a schema is important to usability of the data by the application.

In application development, the relational database model has been a dominant data model. A relational database model is schema based, which means that writing data in a relational database requires that the data conform to a schema explicitly defined for the relational database ("explicit schema"). Data in a relational database is very usable because, among other reasons, the data conforms to a known and well-described schema defined for the relational database.

The relational database model requires that a schema be developed and implemented within a relational database before database data is stored in the database. This requirement may hinder rapid development of applications, an important ability for many software development endeavors. Under rapid development, changes are made to applications in smaller increments but a greater number of more rapid iterations. As an application changes between iterations, the schemas must also evolve just as rapidly. However, under the relational model, new and/or modified schemas with new or modified fields must be defined for the relational database, possibly requiring downtime and database migration.

Schema-Less Data Model

One approach for schema evolution that facilitates rapid development is the use of the schema-less data model. Under the schema-less data model, data may conform to an "implicit schema". Applications may be developed according to the implicit schema. The applications store data that conforms to the implicit schema rather than an explicit schema defined for a database. The capability to store data that does not need to conform to an explicit schema makes it easy to make significant application changes rapidly. Developers do not have to worry about first changing the schema of a database and possibly migrating the database to the new schema.

Relational databases are managed by relational database management systems (RDBMS). An RDBMS provides powerful querying capabilities that make data in a relational database very usable, such as the capability to query data using a query language such as SQL and present the data in relational form, as rows with columns. Realization of the most powerful query capabilities of an RDBMS depends on an explicit schema. Thus, after an application is developed using schema-less data, an explicit schema may be developed for the data so that the data may be migrated to a RDBMS. Defining an explicit schema for schema-less data is a complex and time-consuming task.

Flexible Columns

As shown above, schema-less data provides great flexibility for schema evolvement by reducing or eliminating the need to develop an explicit schema. There is, however, a schema-based approach that also provides flexibility for schema evolution. The approach is referred to as the "flexible fields" approach.

Under the flexible fields approach, schemas are defined with many "pre-created" generic columns; a set of multiple generic columns may be provided for each column data type. As application development leads to a need for new columns, generic columns of suitable data types may be used. The performance advantage of using relational columns is realized without bringing down, for example, a RDBMS to define new columns.

However, the flexible field approach may be clumsy and error prone. The column names are fixed and generic, and a guess must be made on the number of generic columns to define per table. In addition, application developers may unwittingly use the same generic column for multiple application fields.

Based on the foregoing, an approach that facilitates flexible and rapid schema evolution for eventual deployment for schema-based data is desirable.

BRIEF DESCRIPTION OF THE DRAWINGS

In the drawings:

FIG. 1 depicts a dynamic schema table according to an embodiment of the present invention.

FIG. 2B depicts database statements that illustrate how INSERT statements are processed according to an embodiment of the present invention.

FIG. 3B depicts database statements that illustrate how INSERT statements are processed according to an embodiment of the present invention.

FIG. 5 depicts database statements used to illustrate name resolution according to an embodiment of the present invention.

FIG. 6 depicts database statements used to illustrate how Create Table as Select statements are processed according to an embodiment of the present invention.

FIG. 7 depicts a data guide including metadata that describes dynamic columns in a dynamic schema table according to an embodiment of the present invention.

DETAILED DESCRIPTION

Figure 2A:
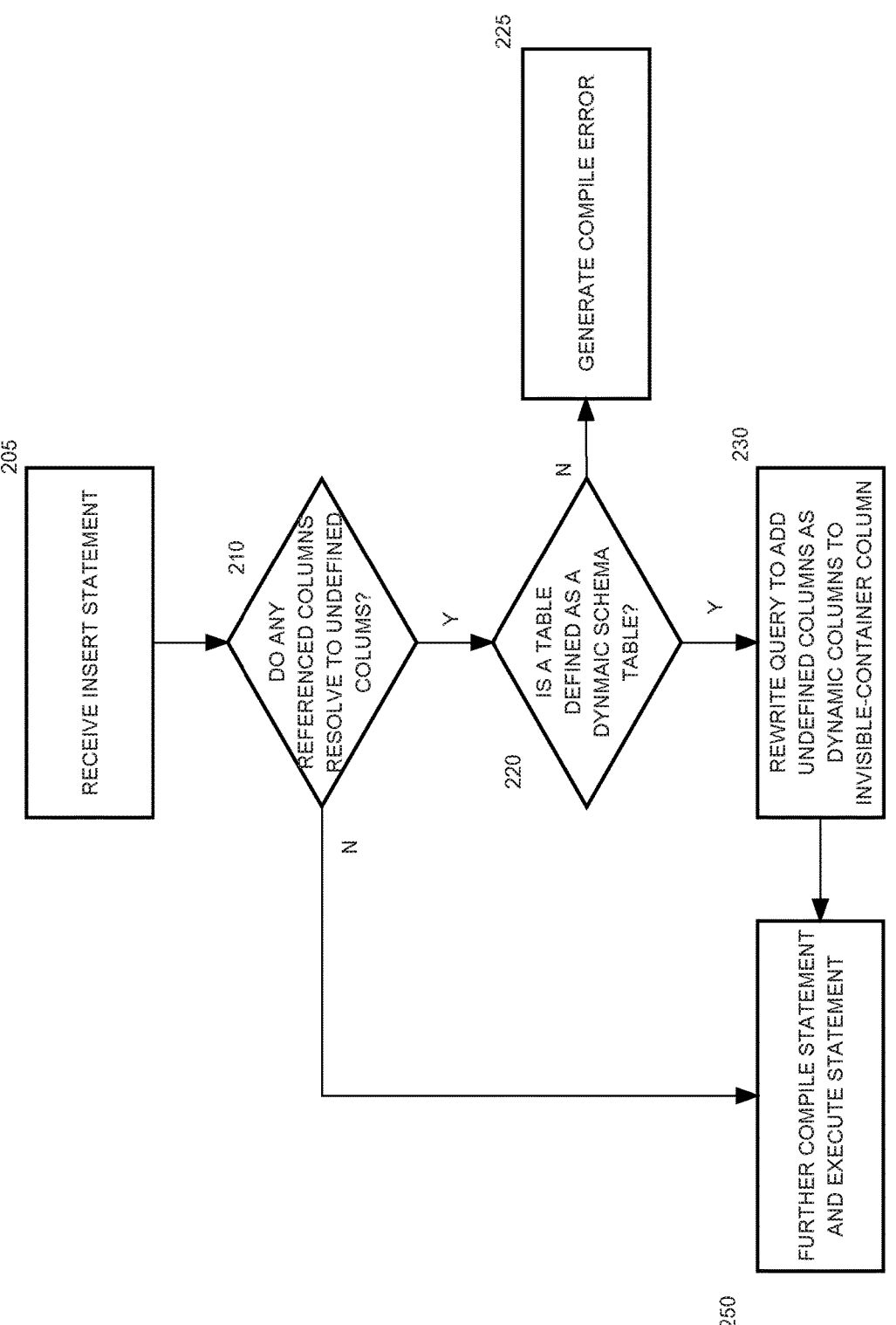
FIG. 2A is a flowchart depicting a procedure for executing an INSERT statement that inserts a row with a dynamic column according to an embodiment of the present invention.

In the following description, for the purposes of explanation, numerous specific details are set forth in order to provide a thorough understanding of the present invention. It will be apparent, however, that the present invention may be practiced without these specific details.

General Overview

Techniques are described that enable new columns to be dynamically created and stored in a database merely in response to receipt of DML ("Data Manipulation Language") SQL statements that reference the columns. The columns, when referenced by the received DML statements, are not defined as a column or attribute of a table by an explicit schema of the database. Such created columns are referred to herein as dynamic columns.

Dynamic columns of a table are stored in an invisible column of the table that is referred to herein as an invisible-container column. A dynamic column and its column values are stored as key-value pairs in the invisible-container column. The key may be the dynamic column name.

To create dynamic columns for a table, the table is first enabled for dynamic-columns. A table enabled for dynamic columns is referred to herein as a dynamic schema table. A dynamic schema table has one or more defined columns and an invisible-container column created in response to being enabled for dynamic-columns. When a DML statement, such as in INSERT statement, is received by a DBMS, and the DML statement references a column that is not defined for a dynamic schema table or any other table in the INSERT statement, the column is added to the invisible-container column as a key-value pair.

Dynamic columns referenced in SQL statements may be treated in the same ways as defined columns. Hence, applications may be developed by treating the dynamic columns as defined columns, but without the need and attendant delay of adapting an explicit schema to define the columns. For example, if a DBMS executes a query statement that references a column of a dynamic schema table, and the column is not defined in the explicit schema for the table, the DBMS extracts the column from the invisible-container column and returns column values for the column, if any.

A DML statement, as the term is used herein, is a SQL statement that specifies to modify data belonging to database object, such as database data stored in a database table. Examples of DML statements include INSERT, UPDATE, and DELETE statements. A SQL statement that specifies to only query database data may be referred to herein as a query statement.

Enabling a Dynamic Schema Table

A dynamic schema table is created in response to DDL statements ("data definition language") that specify to create or alter a table.

FIG. 1 illustrates a DDL statement that enables a dynamic schema table. DDL statement QM specifies to create a table T with NUMBER column c1 and VARCHAR column c2. The key word "DYNAMIC_SCHEMA" included in the "ENABLE" clause specifies that table T is a dynamic schema table. In response to a DBMS receiving the DDL statement QM, the DBMS creates table T with columns c1 and c2, and creates invisible-container column icc1 within table T. According to an embodiment, an invisible-container column may be a BLOB ("binary large object") or CLOB ("character large object") column.

A DBMS also annotates or otherwise marks table T as a dynamic schema table within a database dictionary to define table T as a dynamic schema table. Annotating or marking table T as a dynamic schema table in a database dictionary entails modifying data in the database dictionary that defines a table and attributes of the table.

An existing table may be enabled as a dynamic schema table by issuing an ALTER table statement to a DBMS. DDL statement QA1 is an example of such an ALTER table statement. DDL statement QA1 includes the keyword DYNAMIC_SCHEMA in an ENABLE clause. When a DBMS receives DDL statement QA1, the DBMS detects the keyword and creates the column icc1 in table T.

A dynamic schema table may be unenabled as a dynamic schema table by issuing a DROP statement. Query DDL statement QA2 is an example of such a DROP column DDL statement. In response to a DBMS receiving DDL statement QA2, the DBMS detects the keyword DYNAMIC_SCHEMA in the ENABLE clause, drops the column icc1 in table T, and unmarks table T as a dynamic schema table in the database dictionary.

Insert Statements on Dynamic Schema Tables

An INSERT statement can specify dynamic columns the same way that defined columns may be specified. When an INSERT statement refers to a dynamic column, the INSERT statement is rewritten to add the dynamic column and the corresponding value as a key-value pair to the invisible-container column. Other kinds of DML statements are rewritten in a similar fashion.

FIG. 2A is a flow chart depicting how a DBMS processes INSERT statements on a dynamic schema table. FIG. 2B depicts how several INSERT statements are rewritten to add dynamic columns as key-value pairs to an invisible-container column.

Referring to FIG. 2A, an INSERT statement is received by the DBMS to be processed by the DBMS. (205) Processing a SQL statement involves compiling the SQL statement and executing the SQL statement. Compiling a SQL statement includes at least two phases: a compilation phase and an execution phase. During compilation, a DBMS performs many functions, such as parsing the SQL statement, determining what table(s), column(s), data type(s), etc., are involved, determining whether an index may be used, and generating an execution plan. A SQL statement may also be rewritten into a semantically equivalent form. A reason to rewrite a SQL statement is to rewrite the SQL statement in a way that enables a more efficient execution plan to be generated and to ultimately execute the SQL statement more efficiently. According to an embodiment of the present invention, a DML statement is rewritten to add dynamic columns to an invisible-container column as key-value pairs.

Operations 210 through 230 are performed as part of compiling a SQL statement. An important operation performed while compiling a SQL statement is a name resolution, which entails resolving column identifier references (e.g., column names) in the SQL statement. Resolving referenced column identifiers entails examining the metadata in a database dictionary defining columns of a table to determine whether the referenced columns are defined for that table and what the various properties of the column are, such as the column's data type. Dynamic columns are not defined by the database dictionary metadata that defines the columns of a dynamic schema table. While resolving column identifiers referenced in the INSERT statement, it is determined whether any columns referenced by the INSERT statement are undefined. (210)

If the INSERT statement does not reference any undefined columns, further compilation operations are performed, and the SQL statement is executed. (250)

If the INSERT statement references an undefined column, then at 220, it is determined whether a table referenced by the INSERT statement is a dynamic schema table. The determination is made by examining metadata in the database dictionary defining one or more tables in the INSERT statement. The metadata will mark a dynamic schema table as such. If the table is not a dynamic schema table, then a compile error is generated. (225)

If on the other hand, a table is defined as a dynamic schema table, the INSERT statement is rewritten to treat any undefined column of the table as a dynamic column. The INSERT statement is rewritten to add the column to the invisible-container column of the table as a key-value pair, where the key is the column name. (230) Rewriting a SQL statement to access a dynamic column in an invisible-container column is referred to herein as a dynamic schema table rewrite. After performing the dynamic schema table rewrite, the query is further compiled and then executed. (215)

According to an embodiment, a key-value pair is represented within a JSON ("Java Script Object Notation") object as a field-name-value pair. However, the present invention is not limited to any particular form or format of representing key-value pairs within an invisible-container column. For example, key-value pairs may be formatted according to XML (extensible Markup Language), each as an element value with the element name being the respective column name, or formatted as comma-separated key value pairs.

FIG. 2B depicts several dynamic schema table rewrites for INSERT statements. Referring to FIG. 2B, INSERT statement QI1 is an INSERT-VALUE statement. INSERT statement QI1 references two undefined columns, which are dynamic columns shoe_size and hat size. INSERT statement QI1 is rewritten to QI1RW, which inserts the output of function JSON OBJECT into column icc1. The output of the function is a JSON object representing key-value pairs of dynamic columns shoe_size and hat_size as JSON fields SHOE SIZE and HAT_SIZE. Row 102 represents the inserted row that results from a DBMS executing QI1RW.

INSERT statement QI2 is an INSERT-SELECT statement. INSERT statement QI2 references two undefined columns, which are dynamic columns shoe_size and hat size. INSERT statement QI2 is rewritten to QI2RW, which inserts the output of function JSON_OBJECT into column icc1. The output of the function is a JSON object representing key-value pairs of columns shoe size and hat size as JSON fields SHOE SIZE and HAT SIZE.

An INSERT statement may implicitly refer to columns in a table. An attempt to implicitly refer to a dynamic column results in an error. In FIG. 2B, SQL statement QUIR1 implicitly refers to defined columns c1 and c2 and the SQL statement does not result in an error. However, SQL statement QUIR2 implicitly refers to dynamic columns shoe_size and hat_size. The DBMS generates an error when processing the QUIR2.

Querying a Dynamic Schema Table

A query statement on a dynamic schema table may include references to a dynamic column in places where a defined column may be included. Such places include SELECT clauses and WHERE clauses. Similar to a DML statement, a query statement on a dynamic schema table is rewritten to access key-value pairs within the invisible-container column.

Figure 3A:
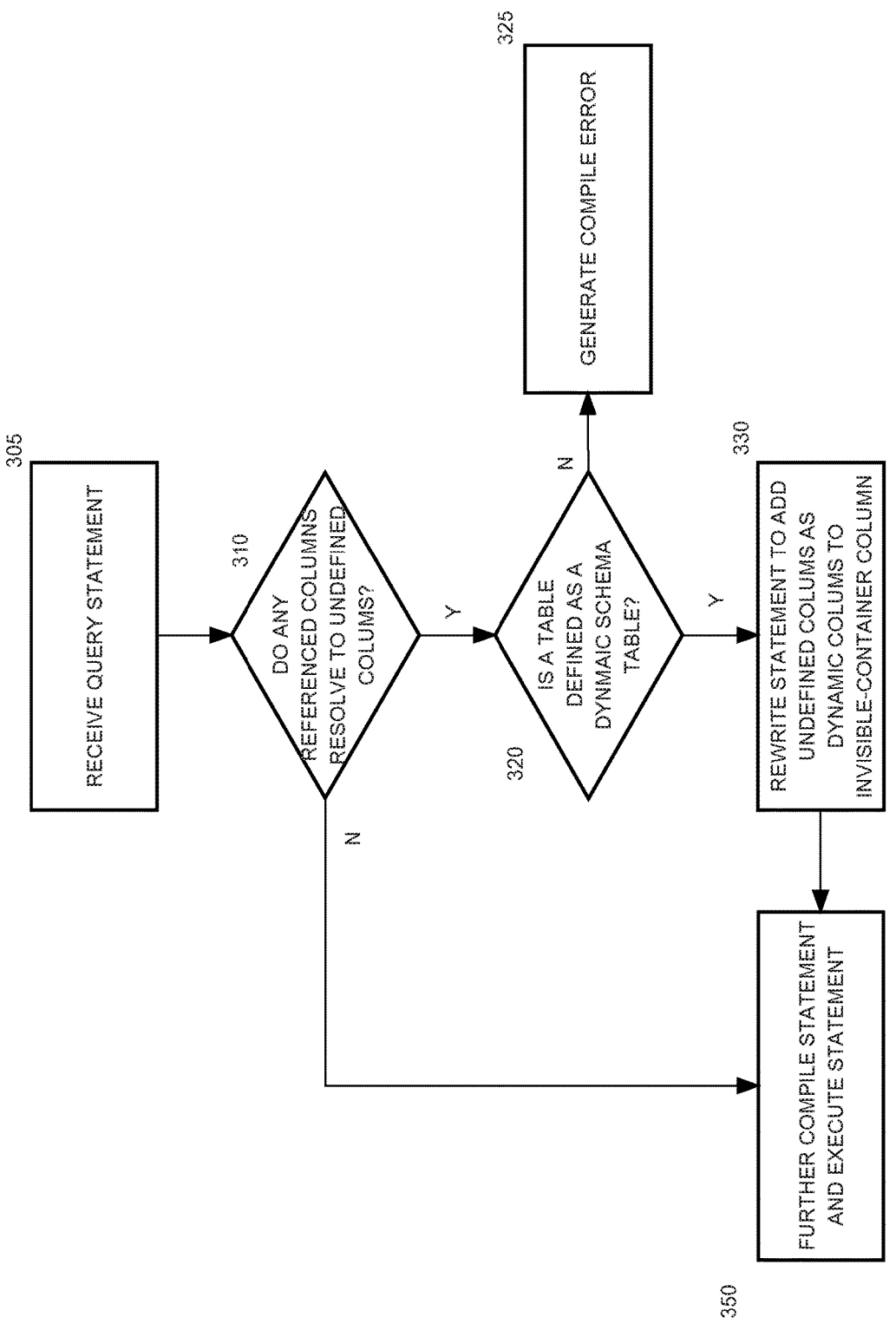
FIG. 3A is a flowchart depicting a procedure for executing a query statement according to an embodiment of the present invention.

FIG. 3A is a flow chart depicting how a DBMS processes query statements on a dynamic schema table. A dynamic schema table rewrite may be performed on the query statements. FIG. 3B depicts how several query statements are rewritten to access dynamic columns in an invisible-container column.

Referring to FIG. 3A, a query statement is received by the DBMS to be compiled and executed by the DBMS. (305) Operations 310 through 330 are performed as part of compiling the query statement.

While resolving column identifiers referenced in the query statement, it is determined whether any columns referenced by the query statement are undefined. (310) If the QUERY statement does not reference any undefined columns, further compilation operations are performed, and the SQL statement is executed. (350)

If the QUERY statement references an undefined column, then it is determined whether a table referenced in the QUERY statement is a dynamic schema table. (320) If the table is not a dynamic schema table, then a compile error is generated. (325)

If on the other hand, there is a table referenced in the QUERY statement that is defined as a dynamic schema table, the query statement is rewritten to treat any undefined column as a dynamic column of the table. The query statement is rewritten to access any dynamic column in the invisible-container column of the table as a key-value pair. (330) After performing the dynamic schema table rewrite, the query is further compiled and then executed. (350)

FIG. 3B depicts several dynamic schema table rewrites for QUERY statements. Referring to FIG. 3B, QUERY statement QQ1 references dynamic column shoe_size in several clauses, a SELECT clause and a WHERE clause.

QUERY statement QQ1 is rewritten to QQ1RW, which extracts column values for shoe_size from column icc1. In effect, column references to shoe_size are replaced by the function JSON_VALUE, the input for which is column icc1. These invocations of JSON_VALUE return the column value of JSON field SHOE_SIZE within a JSON object in icc1 as the dynamic column shoe size.

Importantly, if a JSON object evaluated by function JSON_VALUE does not include the field name requested, then the value NULL is returned. In the case of query statement QQ1RW, NULL does not satisfy the predicate condition expression ">5". Thus, any row containing a JSON object in icc1 that does not include the JSON field 'SHOE_SIZE' cannot satisfy the predicate condition and will not be returned in the result generated for QQ1 by the DBMS.

QUERY statement QQ2 references dynamic columns shoe_size and hat_size. Dynamic column shoe_size is referenced in a SELECT clause, a WHERE clause and a HAVING clause. In addition, shoe_size is referenced by the aggregate function AVG in the SELECT clause and COUNT in the HAVING clause. Dynamic column hat_size is referenced in the SELECT clause and GROUP BY clause.

Query statement QQ2 is rewritten to QQ2RW. In effect, column references to hat size and shoe_size are replaced by the function JSON_VALUE, the input for which is column icc1. The invocations of JSON_VALUE return the column value of the JSON field name SHOE SIZE or HAT_SIZE within a JSON object in icc1. QUERY statement QQ2 demonstrates that dynamic columns can be used for aggregate operations, including as grouping keys for aggregate data from a table.

In SQL, including the "*" operator in the SELECT clause of an SQL statement specifies to project all "visible" columns. Hidden columns are not projected unless issued through a database session with the privileges needed to view hidden columns. According to an embodiment, invisible-container columns are hidden columns.

Other DML Statements—Update and Delete

Other types of DML statements are handled in a similar way that INSERT statements are handled. Such other types of DML statements include UPDATE statements and DELETE statements. When a DBMS finds one or more columns referenced in an UPDATE or DELETE statement that are undefined, and the DBMS determines a table is a dynamic schema table, the statement is rewritten by in effect, replacing dynamic columns with appropriate JSON functions.

Figure 4:
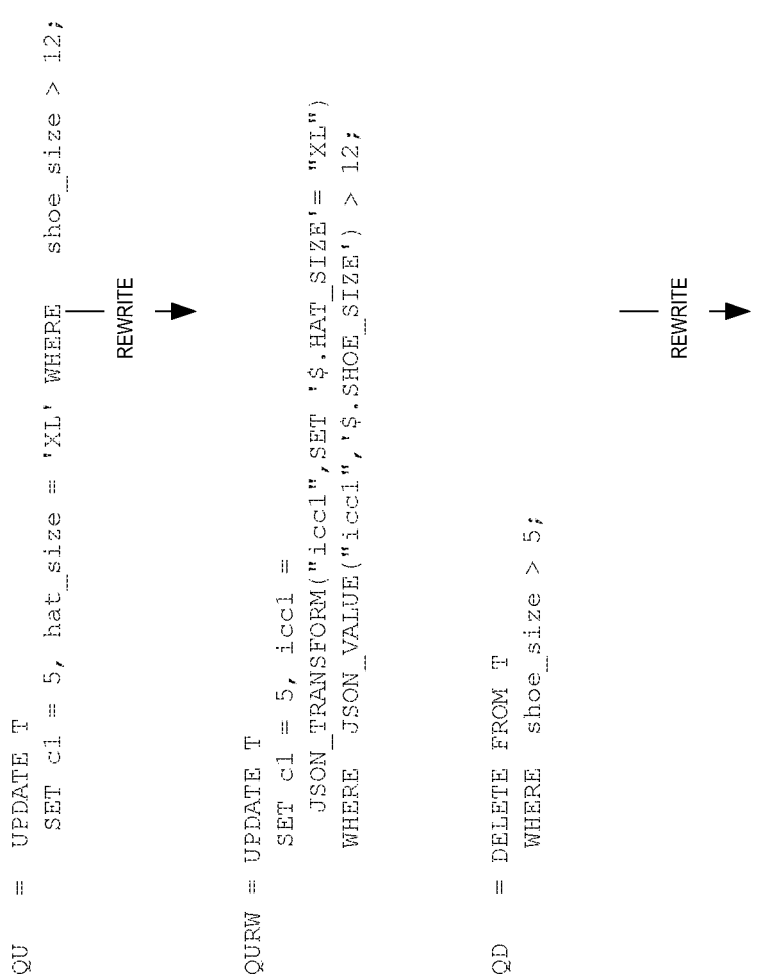
FIG. 4 depicts database statements that illustrate how UPDATE and DELETE statements are processed according to an embodiment of the present invention.

FIG. 4 depicts example UPDATE and DELETE statements used to illustrate how these kinds of DML statements are rewritten. Referring to FIG. 4, UPDATE statement QU updates column c1 and dynamic column hat_size in dynamic schema table T.

QU is rewritten to QURW, which replaces several references to hat size with a JSON function. In the SET clause, the JSON_TRANSFORM function replaces the reference to hat size. The JSON_TRANSFORM function takes as input invisible-container column icc1. If a JSON object includes the field name hat_size, the field is updated to the value specified for column hat_size in QU. Otherwise, a JSON field with that value is added to the JSON object.

QD is a DELETE statement. The statement specifies to delete rows that satisfy a predicate declared in a WHERE clause that references shoe size. DELETE statement QD is rewritten to DELETE statement QDWR. Dynamic column shoe_size is replaced with function JSON VALUE, which takes as input column icc1.

Name Resolution

A SQL statement may reference more than one table. For SQL statements that reference more than one table, name resolution may entail determining which, if any, table has a column referenced in the SQL statement. Even when an SQL statement includes multiple tables, column references may qualify the table for the column, thereby obviating the need to determine which table includes a particular column.

FIG. 5 depicts various SQL statements used to illustrate name resolution as it pertains to dynamic columns and dynamic schema tables. Query statement QR1, in FIG. 5, is an SQL statement that includes "table-qualified" column identifiers. A column identifier that includes an identifier of a table is referred to as a table-qualified column identifier; the respective column may also be referred to as a table-qualified column. A column identifier that does not include an identifier of a table is referred to as an "unqualified" column identifier; the respective column may also be referred to as an unqualified column.

In QR1, T.shoe_size is a qualified column identifier because it includes the table identifier T. Name resolution for shoe_size is limited T, i.e., limited to the columns of table T. Because shoe size is undefined for table T, and table T is a dynamic schema table, shoe_size is resolved to a dynamic column of table T.

In QR2, shoe_size is an unqualified column. Even if only table T is a dynamic schema table, name resolution of shoe_size is performed with respect to both T and EMP. However, if EMP is also a dynamic schema table, and shoe_size is undefined for table EMP as well as table T, then there is an ambiguity regarding whether to treat shoe_size as a dynamic column for T or EMP, and an error is generated.

Name Resolution for Nested Query Blocks

A query block is the basic unit of a SQL statement that specifies a projection operation (e.g. columns specified in a SELECT clause) on a row source (i.e. table, inline view, view referenced by a FROM clause), and may specify additional operations on the row source such as joining and grouping. A query block may be nested within another "outer" query block. A nested query block may be a subquery or inline view.

The set of tables referenced in a SQL statement to which name resolution of a column identifier is limited is referred to herein as the lexical scope of the column identifier or the column. For a SQL statement that includes an outer query, name resolution may be performed multiple times recursively, at different lexical scopes, beginning with each nested query block nested within the outer query block, and then to the outer query block. According to an embodiment, for any column not resolved within the lexical scope of a nested query block, an attempt is made to resolve the column within the lexical scope of the outer query block.

Name resolution for an SQL statement at different lexical scopes is illustrated using query QR3 in FIG. 5. QR3 includes query block QR30, an outer query block that includes nested query block QR3N within a WHERE clause of QR30. A table is within the lexical scope of a query block if the table is referenced within the query block or nested query block of the query block. Table EMP is within the lexical scope of QRN3 but not table T, which is within the lexical scope of QR30.

Name resolution is initially performed within the lexical scope of QR3N. Column EMP.id is a qualified column identifier and is resolvable as a column of table EMP. However, column empid and dynamic column hat_size are not. Name resolution is performed for these columns within the lexical level of QR30, which does reference table T. Column empid is resolvable within table T but not hat_size. Because table T is a dynamic schema table, hat_size is treated as a dynamic column.

Create Table as Select Statements

A Create Table as Select ("CTAS") statement is a DDL statement that specifies to create a table ("destination table") based on the schema of another table ("source table"), and in particular, based on the projected columns of a SELECT statement on the source table. For each column projected for the source, a copy of that column is created in the destination name that includes values from the projected column.

FIG. 6 includes examples CTAS statements, which are used to illustrate how CTAS statements involving a dynamic schema table are handled. By default, a CTAS statement on a source table that is a dynamic schema table does not create any dynamic columns. Referring to FIG. 6, CTAS statement QS1 references dynamic schema table T as a source table. A DBMS creates table T2 only with the defined columns of dynamic schema table T.

A CTAS statement may be used to create a defined column from a dynamic column in a source table. CTAS statement QS2 projects defined columns deptno, dname, loc, and dynamic column hat_size from dynamic schema table T. A DBMS, in response to determining that hat size is undefined for T and that T is a dynamic schema table, creates table T2 with hat_size as a defined column.

A CTAS statement may be used to create a dynamic schema table with all the dynamic columns from the source table. CTAS statement QS3 includes the clause ENABLE DYNAMIC SCHEMA, specifying to the DBMS to create table T2 as a dynamic schema table. Including the table T as an argument to the clause specifies to create all the dynamic columns in the source table T in table T2. This causes the DBMS to insert the values in the invisible-container column icc1 into an invisible-container column created in T2. Without the argument, T2 is created as a dynamic schema table, but with no dynamic columns created in the invisible-container column.

A CTAS statement that specifies to create a dynamic schema table may specify which dynamic columns to create from the source table. CTAS statement QS4 references the dynamic column hat_size to specify to create the dynamic column with target table T2.

A CTAS statement may specify to create a dynamic schema table that includes dynamic columns from multiple tables. CTAS statement QS5 includes the clause ENABLE DYNAMIC SCHEMA, with both table T and EMP as arguments. This causes the DBMS to insert the JSON objects from the invisible-container column from both table T and EMP into a single invisible-container column created in T2.

Viewing Catalogue of Dynamic Columns

According to an embodiment, a data guide is maintained for an invisible-container column. A data guide describes the structures of data that conform to a hierarchical mark-up language (e.g., JSON or XML), such as a collection of dynamic columns stored in each row of a dynamic schema table. The data guide is, in effect, a catalogue of the dynamic columns of a dynamic schema table.

According to an embodiment of the present invention, dynamic columns of a row of a dynamic schema table are stored as a hierarchical data object in the invisible-container column, which may be a BLOB or CLOB column. Each dynamic column is stored as a field within the hierarchical object, with the field name and field value being a key-value pair. When a dynamic column of a row is inserted, updated, or deleted, the data guide is modified accordingly.

The data guide may be created and/or updated as dynamic columns are added, modified or deleted from the invisible-container column. Examples of data guides and maintaining data guides are described in further detail in U.S. patent application Ser. No. 14/699,685, Dynamically Updating Data Guide For Hierarchical Data Objects, filed by Zhen Hua Liu et al. on April, $4^{th}$, 2015, the entire contents of which are incorporated herein by reference.

FIG. 7 depicts a data guide 701, a data guide according to an embodiment of the present invention. For purposes of illustration, dynamic columns are stored in JSON objects within column icc1. Therefore, data guide 701 is a data guide of the JSON data objects stored in column icc1.

Referring to FIG. 7, it depicts data guide 701. Data guide 701 includes columns PID, PATH, DATATYPE, MIN, and MAX. In column PATH, a row in a data guide includes metadata that describes a path found in at least one JSON object. In an embodiment where dynamic columns are scalar values and JSON objects consist of only un-nested fields, a path includes only one field name. Column PID stores path identifiers, a unique number assigned to a path recorded in data guide 701. DATATYPE describes the data type of the one or more values at the path within the JSON objects.

For example, the row containing PID value 1 includes metadata describing the path hat_size, which corresponds to the dynamic column of the same name. Metadata in column DATATYPE specifies that the datatype of the values found at the path have the data type STRING.

A data guide may also describe statistics about dynamic column fields, as illustrated by columns MAX and MIN in data guide 701. For each row therein, MAX and MIN specify the length of value and minimum length of value, respectively, of value found at path.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an operating system process or an operating system thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. java file) and the compiled version of the class (i.e., class file).

DBMS Overview

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an operating system process or an operating system thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. java file) and the compiled version of the class (i.e., class file).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
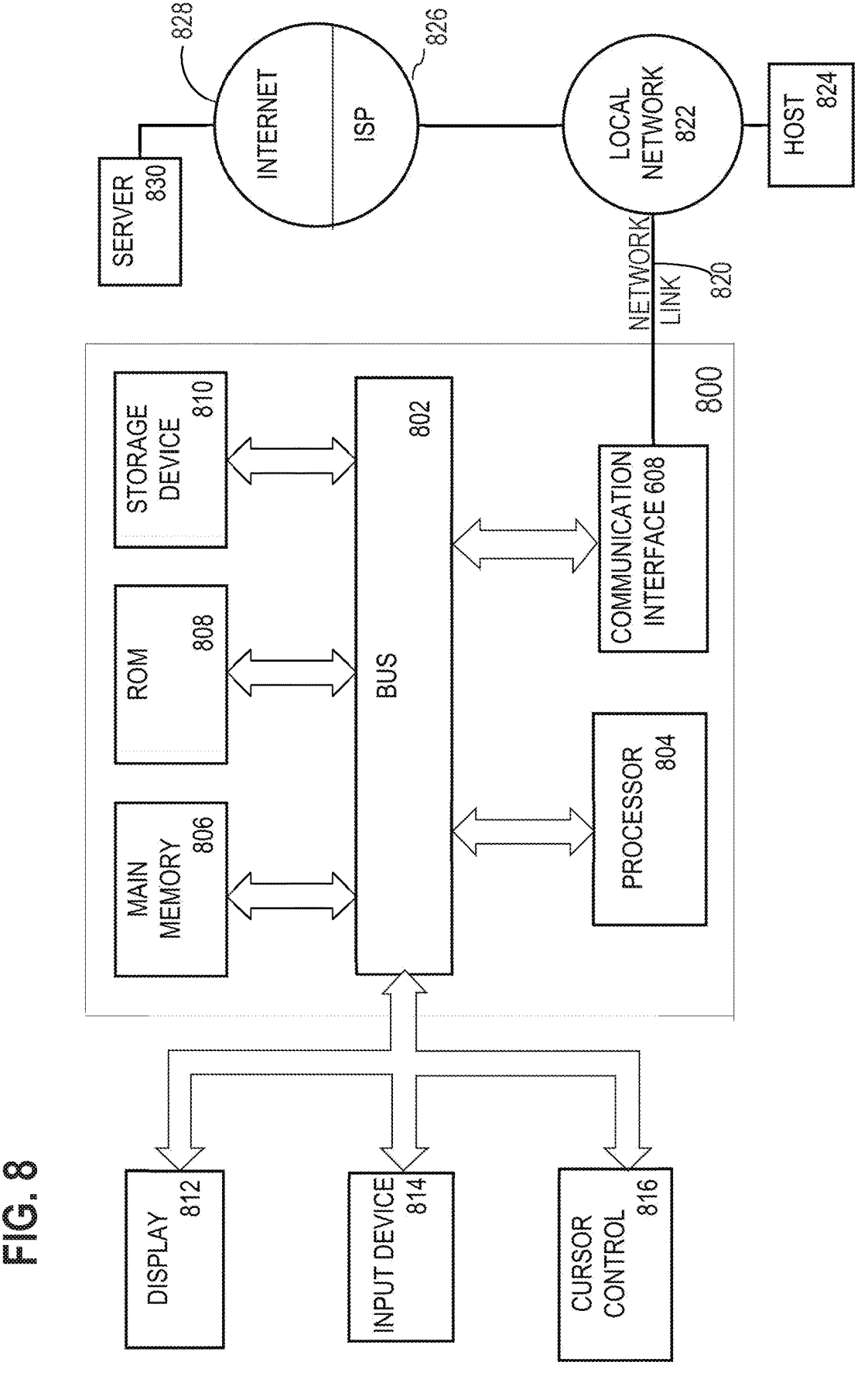
FIG. 8 is a diagram depicting a computer system that may be used to implement an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 9:
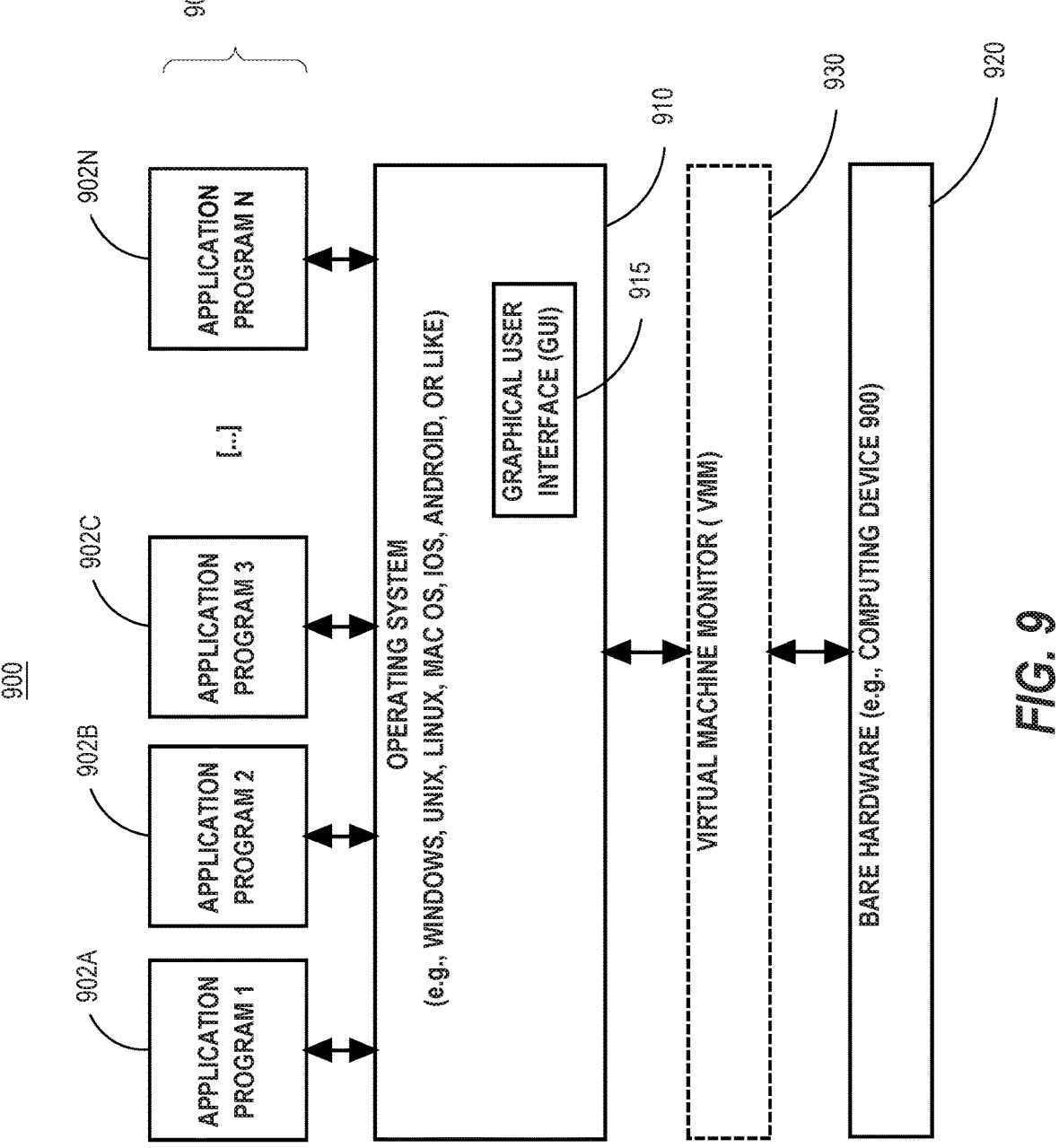
FIG. 9 depicts a software system that may be employed for controlling the operation of a computer system according to an embodiment of the present invention.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method, comprising:
a database management system ("DBMS") receiving a data definition language statement that specifies that a first table in a database is enabled for dynamic schema columns, said database being managed by said DBMS;
in response to receiving said data definition language statement, said DBMS defining said first table as enabled for dynamic schema columns;
said DBMS receiving a first SQL statement that specifies a change operation to a first column of said first table, wherein said first SQL statement is a DML statement, wherein said change operation specifies a new value for said first column;
in response to receiving said first SQL statement, said DBMS compiling said first SQL statement, wherein compiling said first SQL statement includes:
determining that said first SQL statement satisfies first criteria, wherein
said first criteria includes:
said first column is undefined for said first table,
said first table is defined as being enabled for dynamic schema columns;
in response to determining that said first SQL statement satisfies first criteria, rewriting said first SQL statement to cause said change operation to said first column by at least adding said first column to said first table, wherein rewriting said first SQL statement includes rewriting said first SQL statement to add a key-value pair to a second column, wherein said key-value pair represents a column name and value of said first column; and
after compiling said first SQL statement, executing said first SQL statement thereby causing said change operation to be performed to said first column.

2. The method of claim 1, wherein said change operation is one of an INSERT and UPDATE.

3. The method of claim 1, wherein:
said key-value pair is stored within a Java Script Object Notation object, or
said key-value pair is stored within an element that conforms to extensible Mark-up language.

4. The method of claim 1, wherein said second column is an invisible column created in response to said DBMS receiving a data definition language specifying to make said first table as a dynamic schema table.

5. The method of claim 1, further including:
said database management system receiving a second SQL statement that projects said first column;
in response to receiving said second SQL statement, said DBMS compiling said second SQL statement, wherein compiling said second SQL statement includes:
determining that said second SQL statement satisfies second criteria, wherein said
second criteria includes:
said first column is undefined for said first table,
said first table is defined as being enabled for dynamic schema columns;
in response to determining that second SQL statement satisfies second criteria, rewriting said second SQL statement to project said first column;
after compiling said second SQL statement, executing said second SQL statement thereby causing projecting of said first column.

6. The method of claim 5, wherein executing said second SQL statement includes:
projecting said first column for a particular row of said first table that does not include any key-value pair that represents said first column.

7. The method of claim 1, further including:
receiving a second SQL statement that specifies to create a second table having copies of columns of first table, wherein said second SQL statement projects said first column;
in response to receiving said second SQL statement, creating said second table, wherein creating said second table includes defining said second column and copying column values of said first column to said second column.

8. The method of claim 1, further including:
receiving a second SQL statement that specifies to create a second table from the columns of said first table, wherein said second SQL statement specifies to create a copy of said first column as a second column that is a dynamic column in said second table;
in response to receiving said second SQL statement, creating said second column in said second table as a dynamic column.

9. The method of claim 1, further including updating a data guide to add metadata describing said first column.

10. One or more non-transitory computer-readable media storing sequences of instructions that, when executed by one or more processors, cause:
a database management system ("DBMS") receiving a data definition language statement that specifies that a first table in a database is enabled for dynamic schema columns, said database being managed by said DBMS;
in response to receiving said data definition language statement, said DBMS defining said first table as enabled for dynamic schema columns;
said DBMS receiving a first SQL statement that specifies a change operation to a first column of said first table, wherein said first SQL statement is a DML statement, wherein said change operation specifies a new value for said first column;
in response to receiving said first SQL statement, said DBMS compiling said first SQL statement, wherein compiling said first SQL statement includes:
determining that said first SQL statement satisfies first criteria, wherein
said first criteria includes:
said first column is undefined for said first table,
said first table is defined as being enabled for dynamic schema columns;
in response to determining that said first SQL statement satisfies first criteria, rewriting said first SQL statement to cause said change operation to said first column by at least adding said first column to said first table, wherein rewriting said first SQL statement includes rewriting said first SQL statement to add a key-value pair to a second column, wherein said key-value pair represents a column name and value of said first column; and
after compiling said first SQL statement, executing said first SQL statement thereby causing said change operation to be performed to said first column.

11. The one or more non-transitory computer-readable media of claim 10, wherein said change operation is one of an INSERT and UPDATE.

12. The one or more non-transitory computer-readable media of claim 10, wherein:
said key-value pair is stored within a Java Script Object Notation object, or
said key-value pair is stored within an element that conforms to extensible Mark-up language.

13. The one or more non-transitory computer-readable media of claim 10, wherein said second column is an invisible column created in response to said DBMS receiving a data definition language specifying to make said first table as a dynamic schema table.

14. The one or more non-transitory computer-readable media of claim 10, wherein the sequences of instructions include instructions that, when executed by said one or more processors, cause:
said database management system receiving a second SQL statement that projects said first column;
in response to receiving said second SQL statement, said DBMS compiling said second SQL statement, wherein compiling said second SQL statement includes:
determining that said second SQL statement satisfies second criteria, wherein said
second criteria includes:
said first column is undefined for said first table,
said first table is defined as being enabled for dynamic schema columns;
in response to determining that second SQL statement satisfies second criteria, rewriting said second SQL statement to project said first column;
after compiling said second SQL statement, executing said second SQL statement thereby causing projecting of said first column.

15. The one or more non-transitory computer-readable media of claim 14, wherein executing said second SQL statement includes:
projecting said first column for a particular row of said first table that does not include any key-value pair that represents said first column.

16. The one or more non-transitory computer-readable media of claim 10, wherein the sequences of instructions include instructions that, when executed by said one or more processors, cause:
receiving a second SQL statement that specifies to create a second table having copies of columns of first table, wherein said second SQL statement projects said first column;
in response to receiving said second SQL statement, creating said second table, wherein creating said second table includes defining said second column and copying column values of said first column to said second column.

17. The one or more non-transitory computer-readable media of claim 10, wherein the sequences of instructions include instructions that, when executed by said one or more processors, cause:
receiving a second SQL statement that specifies to create a second table from the columns of said first table, wherein said second SQL statement specifies to create a copy of said first column as a second column that is a dynamic column in said second table;
in response to receiving said second SQL statement, creating said second column in said second table as a dynamic column.

18. The one or more non-transitory computer-readable media of claim 10, wherein the sequences of instructions include instructions that, when executed by said one or more processors, cause: updating a data guide to add metadata describing said first column.

* * * * *